(12) United States Patent
Nemiroff et al.

(10) Patent No.: US 7,675,970 B2
(45) Date of Patent: Mar. 9, 2010

(54) METHOD AND APPARATUS FOR PROCESSING A BITSTREAM IN A DIGITAL VIDEO TRANSCODER

(75) Inventors: Robert S. Nemiroff, Carlsbad, CA (US); Siu-Wai Wu, San Diego, CA (US)

(73) Assignee: General Instrument Corporation, Horsham, PA (US)

( * ) Notice: Subject to any disclaimer, the term of this patent is extended or adjusted under 35 U.S.C. 154(b) by 1058 days.

(21) Appl. No.: 10/755,429

(22) Filed: Jan. 12, 2004

(65) Prior Publication Data
US 2005/0152449 A1    Jul. 14, 2005

(51) Int. Cl.
H04N 7/26    (2006.01)
H04N 7/12    (2006.01)

(52) U.S. Cl. .............. 375/240.03; 375/240.04; 375/240.05

(58) Field of Classification Search ......... 375/240.02, 375/240.03, 240
See application file for complete search history.

(56) References Cited

U.S. PATENT DOCUMENTS

| | | | |
|---|---|---|---|
| 5,539,663 A * | 7/1996 | Agarwal .............. | 348/406.1 |
| 5,610,659 A * | 3/1997 | Maturi et al. ......... | 375/240.24 |
| 5,687,095 A * | 11/1997 | Haskell et al. ......... | 348/386.1 |
| 5,729,293 A | 3/1998 | Keesman .............. | 348/401 |
| 6,072,831 A * | 6/2000 | Chen ................. | 375/240.03 |
| 6,084,909 A * | 7/2000 | Chiang et al. ......... | 375/240.03 |
| 6,167,084 A | 12/2000 | Wang et al. ........... | 375/240 |
| 6,208,688 B1 | 3/2001 | Seo et al. ............ | 375/240.03 |
| 6,259,733 B1 | 7/2001 | Kaye et al. | |
| 6,324,214 B2 * | 11/2001 | Mihara ............... | 375/240.02 |
| 6,480,539 B1 * | 11/2002 | Ramaswamy .......... | 375/240.03 |
| 7,079,581 B2 * | 7/2006 | Noh et al. ............ | 375/240.16 |
| 2001/0014121 A1 * | 8/2001 | Kaye et al. ........... | 375/240.03 |
| 2002/0106022 A1 * | 8/2002 | Satoh et al. .......... | 375/240.03 |
| 2004/0234150 A1 * | 11/2004 | Chang ................ | 382/251 |
| 2005/0025249 A1 | 2/2005 | Zhao et al. | |
| 2006/0088099 A1 * | 4/2006 | Gao et al. ............ | 375/240.16 |

OTHER PUBLICATIONS

Wee, S. J. et al. "Field-to-Frame Transcoding With Spatial and Temporal Downsampling". Procedings of the 1999 IEEE International Confrenece on Image Processing, Oct. 1999, vol. 4, pp. 271-275.*

(Continued)

Primary Examiner—David Czekaj
Assistant Examiner—David N Werner
(74) Attorney, Agent, or Firm—Stewart M. Wiener

(57) ABSTRACT

A method and apparatus for processing a bitstream in a digital video transcoder is described. In one example, an adjustment factor is determined that relates a number of bits representing a selected frame defined by the bitstream to a target number of bits for the selected frame. An average spatial activity value among sets of video data is associated with the selected frame. A spatial activity value for a selected set of the sets of video data is determined. A normalized spatial, activity value for the selected set of frequency video data is then computed in response to the average spatial activity value, the spatial activity value, and a function of the adjustment factor. Target bit reduction for each of the sets of video data may be computed using a function of the normalized spatial activity value and the adjustment factor.

25 Claims, 5 Drawing Sheets

OTHER PUBLICATIONS

C.E. Shannon, "A Mathematical Theory of Communication", Bell System Technical Journal, vol. 27, pp. 379-423, 623-656, Jul., Oct. 1948.*

G. Keesman et al., "Transcoding of MPEG Bitstreams," Signal Processing: Image Communication, vol. 8, Issue 6, Sep. 1996, pp. 481-500.

* cited by examiner

METHOD AND APPARATUS FOR PROCESSING A BITSTREAM IN A DIGITAL VIDEO TRANSCODER

BACKGROUND OF THE INVENTION

1. Field of the Invention

The present invention generally relates to digital video processing and, more particularly, to a method and apparatus for processing a bitstream in a digital video transcoder.

2. Description of the Related Art

Transcoding is an operation for converting a bitstream of one rate into another bitstream of a different rate. For example, the bitstream may represent compressed video data in accordance with an MPEG standard (Moving Pictures Expert Group), such as MPEG-2 as defined in ISO/IEC Standard 13818. A transcoder is typically employed to change the bit-rate of a previously encoded bitstream before transmission over a channel with insufficient bandwidth for supporting the initial bit-rate. That is, if the bandwidth of the transmission channel is narrower than the bit-rate of the bitstream, a transcoder may be employed to change the bit-rate to match the bandwidth of the channel.

It is known to employ an adaptive quantization level (AQL) algorithm within an encoder during the quantization process. One example of such an AQL algorithm is described in MPEG-2 Test Model 5 (TM5). AQL algorithms attempt to lower quantization noise in low activity areas, while taking bits away from high activity areas. It is advantageous to lower quantization noise in low activity areas, since compression artifacts are more noticeable in such low activity areas. In high activity areas, however, quantization noise may be hidden.

Some transcoders employ a re-quantization process to adjust the bit-rate of the input bitstream. Conventional AQL algorithms that are adapted for use during the encoding process do not work well in the re-quantization process of a transcoder. Notably, conventional AQL algorithms do not account for the fact that the input bitstream contains data that has already been quantized. When used in a transcoder, such algorithms may attempt to reduce the quantization level below that of the input quantization level. This will cause the output bitstream to have worse quality in the high-activity areas with no improvement in the low-activity areas.

SUMMARY OF THE INVENTION

A method and apparatus for processing a bitstream in a digital video transcoder is described. In accordance with one aspect of the invention, an adjustment factor is determined that relates a number of bits representing a selected frame defined by the bitstream to a target number of bits for the selected frame. An average spatial activity value among sets of video data is associated with the selected frame. A spatial activity value for a selected set of the sets of video data is determined. A normalized spatial activity value for the selected set of frequency video data is then computed in response to the average spatial activity value, the spatial activity value, and a function of the adjustment factor. Target bit reduction for each of the sets of video data may be computed using a function of the normalized spatial activity value and the adjustment factor.

Another aspect of the invention is an apparatus for transcoding an input bitstream having a first bit-rate to an output bitstream having a second bit-rate. A decoder decodes the input bitstream and produces decoded data. A quantizer quantizes the decoded data. An encoder encodes the quantized data and produces the output bitstream. A controller determines quantization adjustment factors associated with a change from the first bit-rate to the second bit-rate, computes adaptive quantization factors based on said quantization adjustment factors, and controls a quantization level of the quantizer in accordance with the adaptive quantization factors.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, wherever possible, to designate identical elements that are common to the figures.

DETAILED DESCRIPTION OF THE INVENTION

Figure 1:
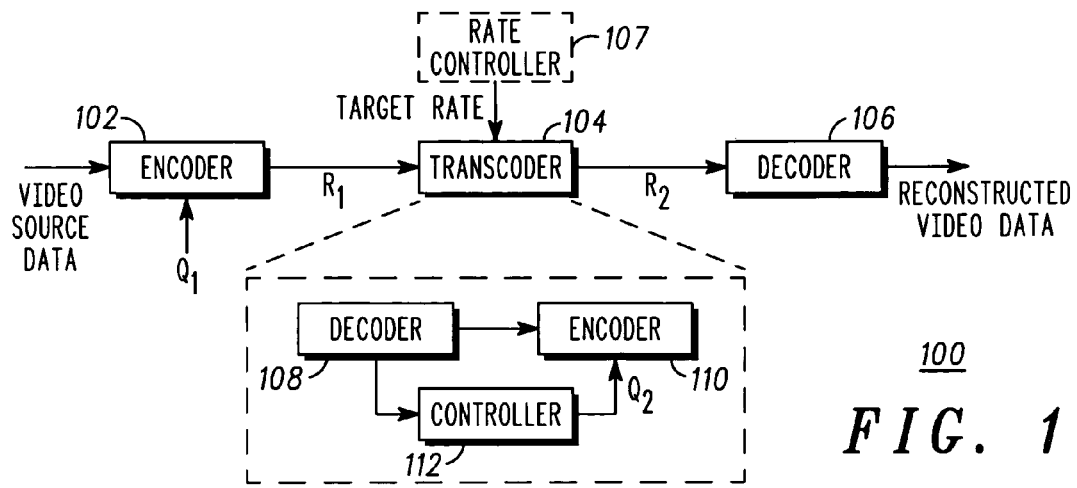
FIG. 1 is a block diagram depicting an exemplary embodiment of a digital video distribution system.

FIG. 1 is a block diagram depicting an exemplary embodiment of a digital video distribution system 100. The system 100 comprises an encoder 102, a transcoder 104, and a decoder 106. An input port of the encoder 102 is configured to receive video source data (i.e., pixel domain data). The encoder 102 processes the source data at a quantization level (e.g., step size) $Q_1$ to produce a bitstream having a bit-rate $R_1$. The quantization level $Q_1$ and the bit-rate $R_1$ may vary over time. An input port of the transcoder 104 is coupled to an output port of the encoder 102 for receiving the bitstream. The transcoder 104 processes the bitstream to adjust the bit-rate from $R_1$ to $R_2$ in accordance with a target rate. The target rate may be a fixed parameter of the transcoder 104 or may be provided by a rate controller 107. An input port of the decoder 106 is coupled to an output port of the transcoder 104 for receiving a bitstream having a bit-rate $R_2$. The decoder 106 processes the bitstream to produce reconstructed video data.

The transcoder 104 illustratively comprises a decoder 108, an encoder 110, and a controller 112. The bitstream from the encoder 102 is processed by the decoder 108 to reconstruct the video source data. The reconstructed data is processed by the encoder 110 at a different quantization level $Q_2$ to produce the bitstream having the bit-rate $R_2$. The quantization level $Q_2$ and the bit-rate $R_2$ may vary over time. Typically, the bit-rate $R_2$ is less than or equal to the bit-rate $R_1$ for the same video source data. An input port of the controller 112 receives data from the decoder 108 and determines the desired value for the quantization level $Q_2$, as described in detail below. An output port of the controller 112 provides the determined value for the quantization level $Q_2$ to the encoder 110.

Figure 2:
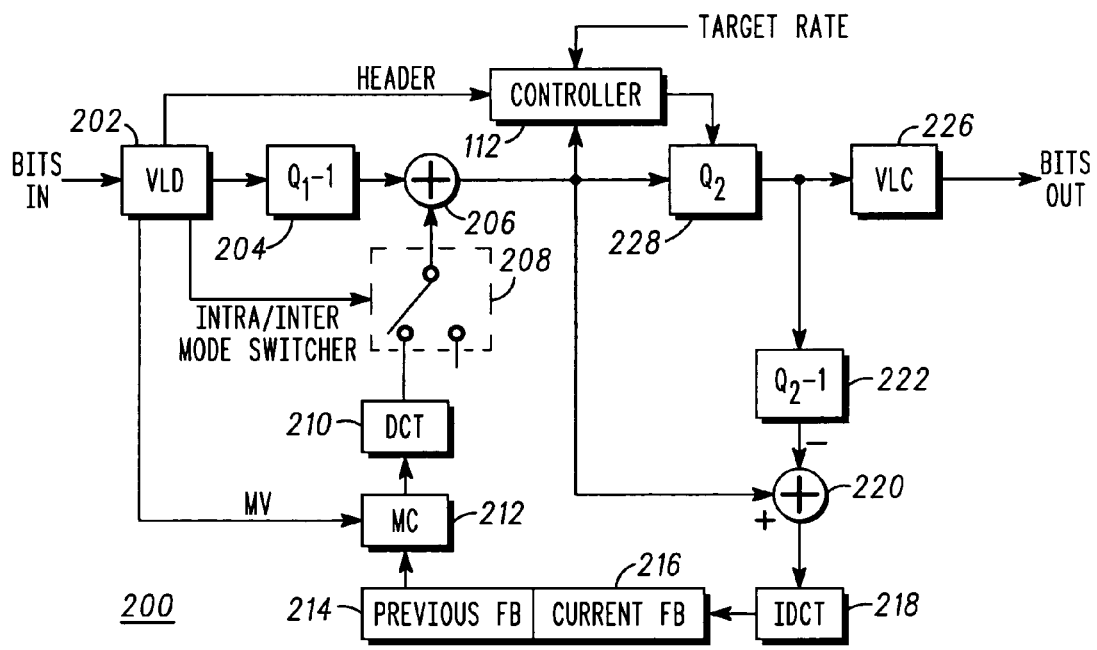
FIG. 2 is a block diagram depicting an exemplary embodiment of a transcoder for transcoding an MPEG-2 bitstream.

FIG. 2 is a block diagram depicting an exemplary embodiment of a transcoder 200 for transcoding an MPEG-2 bitstream. The transcoder 200 may be used as the transcoder 104 shown in FIG. 1. The complexity of the transcoder 200 is reduced due to sharing of hardware and processing steps among the decoder and encoder portions. The transcoder 200 comprises a variable length decoder (VLD) 202, an inverse quantizer 204, and adder 206, an intra/inter mode switcher 208, a discrete cosine transform (DCT) unit 210, a motion compensation (MC) unit 212, a previous frame buffer (FB) 214, a current frame buffer (FB) 216, an inverse discrete cosine transform (IDCT) unit 218, an adder 220, an inverse quantizer 222, a quantizer 228, and a variable length coder (VLC) 226.

An input bitstream is coupled to an input port of the VLD 202. The VLD 202 decodes the bitstream in a well-known manner. Output ports of the VLD 202 are coupled to the controller 112, the inverse quantizer 204, the intra/inter mode switcher 208, and the MC unit 212. Notably, the VLD 202 provides header data to the controller 112, DCT coefficient data to the inverse quantizer 204, mode switching data to the intra/inter mode switcher 208, and motion vector (MV) data to the MC unit 212. The inverse quantizer 204 processes the output of the VLD 202 using a first quantization level $Q_1$. The quantization level $Q_1$ is variable and may change for each macroblock processed. An output port of the inverse quantizer 204 is coupled to the adder 206.

The adder 206 sums the output of the inverse quantizer 204 with either transform domain data from the DCT unit 210 or a null signal, according to the position of the switch 208. The position of the switch 208 is controlled in accordance with intra/inter mode switching data from the VLD 202. Output from the adder 206 is provided to the controller 112, the quantizer 228, and the adder 220.

The quantizer 228 processes the output of the adder 206 using a second quantization level $Q_2$. The controller 112 uses header data from the VLD 202, output from the adder 206, and target rate data (e.g., from the rate controller 107) to determine the value of the quantization level $Q_2$, which is provided to the quantizer 228. Output of the quantizer 228 is provided to the inverse quantizer 222 and the VLC 226. The VLC 226 processes output from the quantizer 228 in a well-known manner to produce an output bitstream.

The inverse quantizer 222 processes the output of the quantizer 228 using the second quantization level $Q_2$. The quantization level $Q_2$ is variable and may change for each macroblock processed. Output of the quantizer 228 is provided to the adder 220. The adder 220 subtracts output of the inverse quantizer 222 from output of the adder 206 to produce transform domain difference data. The transform domain difference data is provided to the IDCT unit 218. The IDCT unit 218 processes the transform domain difference data to provide pixel domain data to the current FB 216 for I and P frames. Prior to writing data to the current FB 216, the contents of the current FB 216 are copied into the previous FB 214. Data from the current FB 216 and the previous FB 214 are provided to the MC unit 212. The MC unit 212 processes the MV data from the VLD 202 and the data provided by the current FB 216 and the previous FB 214 in a well-known manner to provide MC data. The MC data is provided to the DCT unit 210. The DCT unit 210 processes the MC data to provide transform domain data to the intra/inter mode switch 208.

Figure 3:
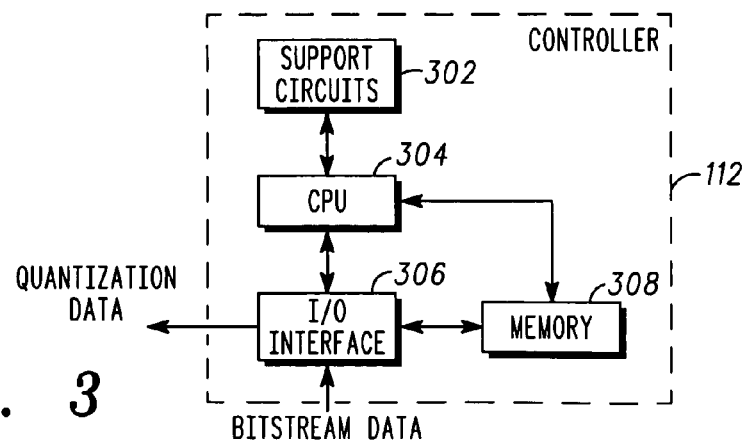
FIG. 3 is a block diagram depicting an exemplary embodiment of a controller shown in FIGS. 1 and 2.

FIG. 3 is a block diagram depicting an exemplary embodiment of the controller 112 shown in FIGS. 1 and 2. The controller 112 comprises a central processing unit (CPU) 304, a memory 308, various support circuits 302, and an I/O interface 306. The CPU 304 may be any type of microprocessor, digital signal processor (DSP), instruction-set processor, and like type processors known in the art. The support circuits 302 for the CPU 304 include conventional cache, power supplies, clock circuits, data registers, I/O interfaces, and the like. The I/O interface 306 may be directly coupled to the memory 308 or coupled through the CPU 304. The I/O interface 306 may be configured to receive bitstream data and configured to provide quantization data.

The memory 308 may store all or portions of one or more programs and/or data to implement the processes and methods described herein. The memory 308 may include one or more of the following random access memory, read only memory, magneto-resistive read/write memory, optical read/write memory, cache memory, magnetic read/write memory, and the like, as well as signal-bearing media as described below. Although the invention is disclosed as being implemented as a processor executing a software program, those skilled in the art will appreciate that the invention may be implemented in hardware, software, or a combination of hardware and software. Such implementations may include a number of processors independently executing various programs and dedicated hardware, such as application specific integrated circuits (ASICs), field programmable gate arrays (FPGAs), and like type integrated circuit devices.

Figure 4:
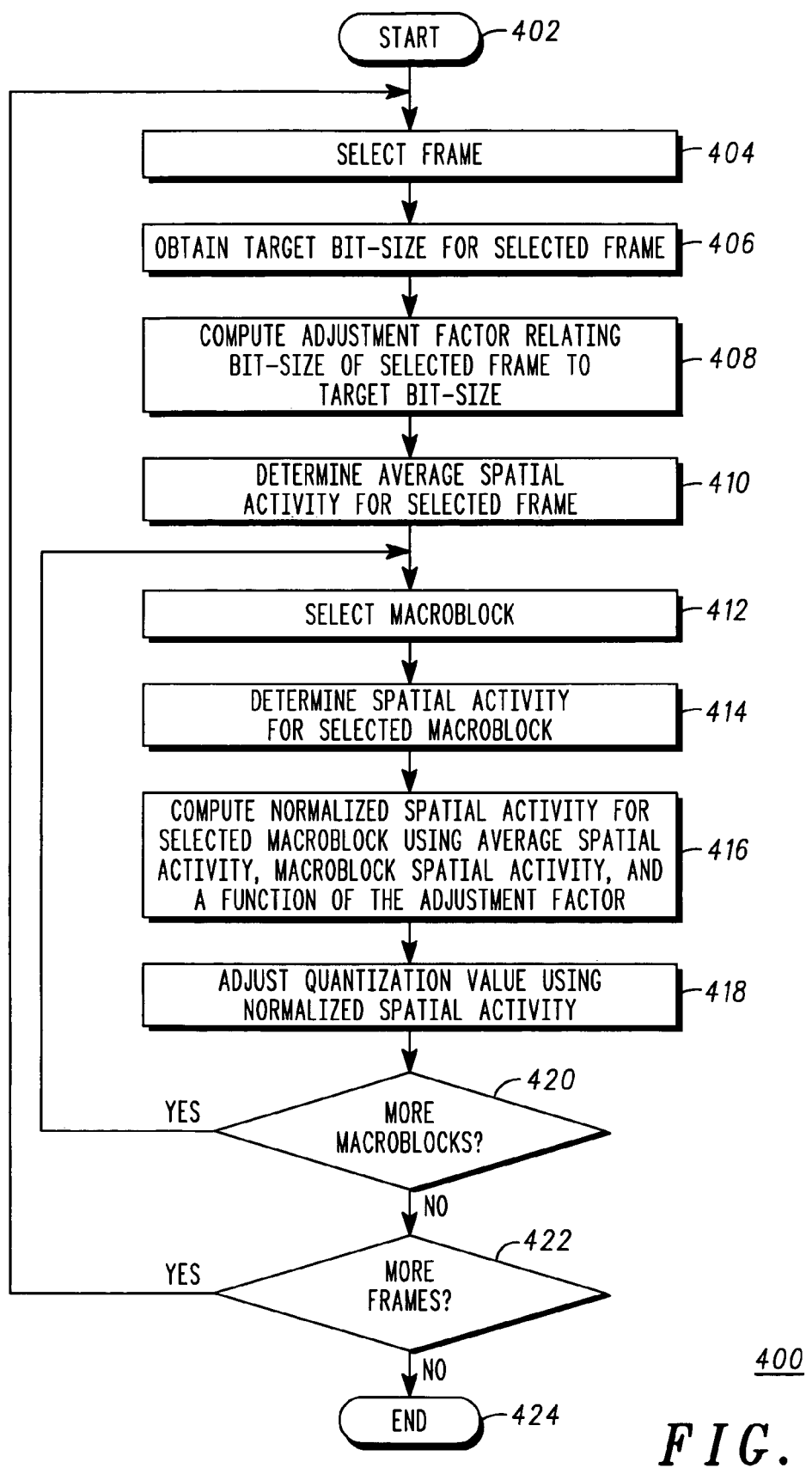
FIG. 4 is a flow diagram depicting an exemplary embodiment of a process for transcoding a bitstream in accordance with one or more aspects of the invention.

FIG. 4 is a flow diagram depicting an exemplary embodiment of a process 400 for transcoding a bitstream in accordance with one or more aspects of the invention. The process 400 may be executed by the controller 112 shown in FIGS. 1 and 2, described above. The process 400 begins at step 402. At step 404, a frame or picture (hereinafter referred to as a frame) is selected from the input bitstream for processing. At step 406, a target bit-size for the selected frame is received. For example, the target bit-size for the selected frame may be determined in accordance with a desired bit-rate for the output bitstream of the transcoder. At step 408, an adjustment factor (also referred to as a quantization adjustment factor) is defined that relates the bit-size of the selected frame to the target bit-size. For example, the adjustment factor may be defined as follows:

$$rcFactor = \frac{inputPictureSize}{targetPictureSize}. \qquad \text{Eq. 1}$$

where rcFactor is the adjustment factor, inputPictureSize is the bit-size of the selected frame, and targetPictureSize is the bit-size of the target picture. As described below, the adjustment factor is used to adjust the quantization level associated with the input bitstream to achieve a target bit-rate for the output bitstream.

At step 410, an average spatial activity value is determined among macroblocks of the selected frame. The average spatial activity value is an average measure of variance or "activity" among the coded macroblocks that comprise the selected frame. In one embodiment of the invention, the average spatial activity of a current frame may be computed using the average spatial activity of a previous frame and the input picture sizes of the current and a previous frame, as described below with respect to FIG. 7. Alternatively, the average spatial activity of the current frame may be determined by averaging the spatial activities of the individual macroblocks in the selected frame before proceeding to step 412.

At step 412, a macroblock is selected from the selected frame for processing. At step 414, a spatial activity value is determined for the selected macroblock. In one embodiment, the spatial activity for the selected macroblock (as well as for the average spatial activity computed in step 410) may be defined with respect to the quantization level of the input bitstream associated with the macroblock. In another embodiment, the spatial activity for the selected macroblock (as well as for the average spatial activity computed in step 410) may be defined with respect to the DCT coefficients associated with the macroblock, as described below with respect to FIG. 6. At step 416, a normalized spatial activity value is determined for the selected macroblock based on the average spatial activity value for the selected frame, the spatial activity value for the selected macroblock, and a function of the adjustment factor. One embodiment of a function for computing the normalized spatial activity value is described below.

At step 418, a quantization value associated with the selected macroblock is adjusted in response to the normalized spatial activity value computed in step 416. In one embodiment of the invention, the quantization level is adjusted in accordance with the following:

$$outQL_j = inQL_j \times rcFactor \times N\_act_j \qquad \text{Eq. 2,}$$

where $outQL_j$ is the adjusted quantization value (i.e., $Q_2$) for the jth selected macroblock, in $QL_j$ is the input quantization value (i.e., $Q_1$) for the jth selected macroblock, rcFactor is the adjustment factor computed in step 408, and $N\_act_j$ is the normalized spatial activity value for the jth selected macroblock (also referred to as the AQL factor). By using the normalized spatial activity value, the quantization level is adjusted adaptively from macroblock to macroblock of a given frame, and from frame to frame in the input bitstream.

At step 420, a determination is made as to whether there are more macroblocks to be processed in the selected frame. If so, the process 400 returns to step 412. Otherwise, the process 400 proceeds to step 422. At step 422, a determination is made as to whether there are more frames to be processed in the input bitstream. If so, the process 400 returns to step 404. Otherwise, the process 400 proceeds to end step 424.

As described above, the normalized spatial activity value for the selected macroblock is employed to adjust the quantization level of macroblock. In one embodiment of the invention, the normalized spatial activity value is defined in accordance with the following:

$$N\_act_j = \frac{f(rcFactor) \times act_j + avg\_act}{act_j + f(rcFactor) \times avg\_act}, \qquad \text{Eq. 3}$$

where $N\_act_j$ is the normalized spatial activity for the jth macroblock, rcFactor is the adjustment factor determined in step 408, $f$ is a function of the adjustment factor, $act_j$ is the spatial activity value of the jth macroblock, and avg_act is the average spatial activity value for the selected frame. Employing a function of the adjustment factor in the normalization function results in a visible improvement for low activity areas of the selected frame with no detectible degradation in high activity areas.

Figure 5:
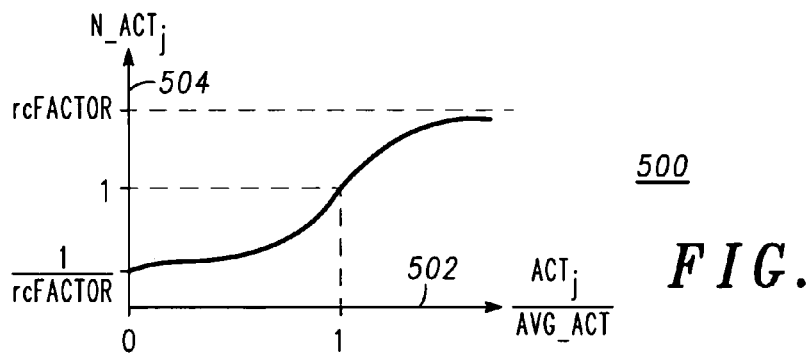
FIG. 5 is a graph illustrating an exemplary embodiment of a normalization function for use with the transcoding processes described herein.

Notably, in one embodiment of the invention, the function of the adjustment factor used in the normalization function is defined as:

$$f(rcFactor) = rcFactor \qquad \text{Eq. 4,}$$

where rcFactor is the adjustment factor computed in step 408. FIG. 5 is a graph 500 illustrating an exemplary embodiment of the normalization function of Equation 2, where $f(rcFactor)=rcFactor$. The graph 500 includes an axis 502 representing the ratio of the spatial activity of the jth macroblock to the average spatial activity of the selected frame, and an axis 504 representing the normalized spatial activity for the jth macroblock.

As is apparent from the graph 500, when the spatial activity for the jth macroblock is equal to the average spatial activity of the frame, the normalized spatial activity is equal to one. When the spatial activity for the jth macroblock is small (e.g., near zero), the normalized spatial activity approaches 1/rcFactor and the output quantization level (i.e., $outQL_j$ of Equation 3) will not be increased, since rcFactor/rcFactor equals one. When the spatial activity for the jth macroblock is large (e.g., $act_j \gg avg\_act$), the normalized spatial activity approaches rcFactor and the output quantization level will be increased by a maximum of the square of rcFactor. Thus, the quantization level for low activity areas (i.e., areas that are most affected by quantization noise) is advantageously not adjusted. The quantization level for high activity areas (i.e., areas where quantization noise has little visual effect) is advantageously adjusted, which results in an attendant decrease in the bit-rate of the output bitstream. Implementing the normalized spatial activity function described above may be costly in a transcoder incapable of a hardware divide. Thus, in one embodiment of the invention described below, a piecewise continuous approximation may be used.

For purposes of clarity by example, the process 400 shown in FIG. 4 and the normalized spatial activity function shown in FIG. 5 has been described with respect to an MPEG-2 bitstream. Notably, the process 400 is employed with respect to macroblocks within frames or pictures defined by the MPEG-2 bitstream. In general, the process 400 may be employed with sets of video data (e.g., pixel domain data, or the corresponding frequency domain coefficient data), of which MPEG-2 macroblocks are examples.

Figure 6:
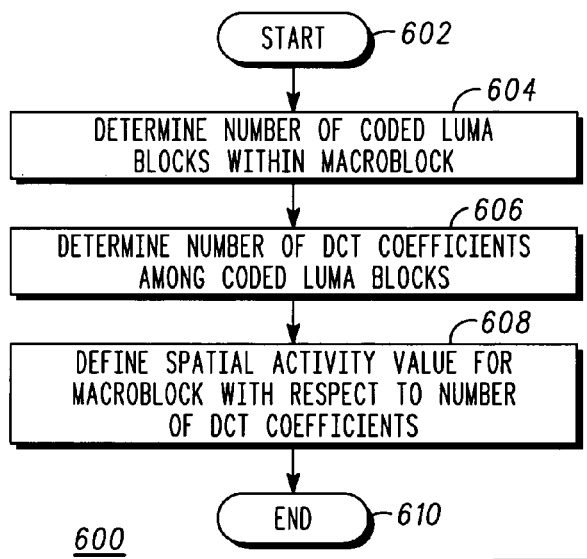
FIG. 6 is a flow diagram depicting an exemplary embodiment of a process for computing spatial activity of a macroblock within an MPEG-2 bitstream in accordance with one or more aspects of the invention.

FIG. 6 is a flow diagram depicting an exemplary embodiment of a process 600 for computing the spatial activity of a macroblock within an MPEG-2 bitstream in accordance with one or more aspects of the invention. The process 600 may be used in step 414 of the process 400 described above with respect to FIG. 4. The process 600 begins at step 602. At step 604, the number of coded luma blocks within the macroblock is determined. For example, the number of coded luma blocks within the macroblock may be determined using the coded block pattern associated with the macroblock. As is well known in the art, the coded block pattern includes information identifying which of the blocks associated with the macroblock (e.g., a macroblock may be associated with four luma blocks and two chroma blocks) include coded information (i.e., are represented by non-zero DCT coefficients).

At step 606, the number of DCT coefficients used to represent the coded luma blocks is determined. At step 608, a spatial activity value is defined with respect to the number of DCT coefficients representing the coded luma blocks. The process 600 ends at step 610. In general, the chroma activity is related to the luma activity, so the DCT coefficients associated with the chroma blocks may be ignored in the activity calculation to save processing cycles. In an alternative embodiment, the DCT coefficients associated with the coded chroma blocks may be used in addition to those of the coded luma blocks. In yet another embodiment, only the coded chroma coefficients may be used to determine spatial activity.

In another embodiment of the invention, the spatial activity value computed at step 608 may be defined with respect to the value of the DCT coefficients (luma coefficients, chroma coefficients, or both), rather than the number of such coefficients. In yet another embodiment, the DCT coefficients used in the spatial activity calculation may be assigned different weights. For purposes of clarity by example, the process 600 has been described with respect to an MPEG-2 bitstream. Notably, the process 600 is employed with respect to DCT coefficients associated with macroblocks defined by the MPEG-2 bitstream. In general, the process 600 may be employed with sets of frequency domain coefficients, of which MPEG-2 macroblocks are examples.

Figure 7:
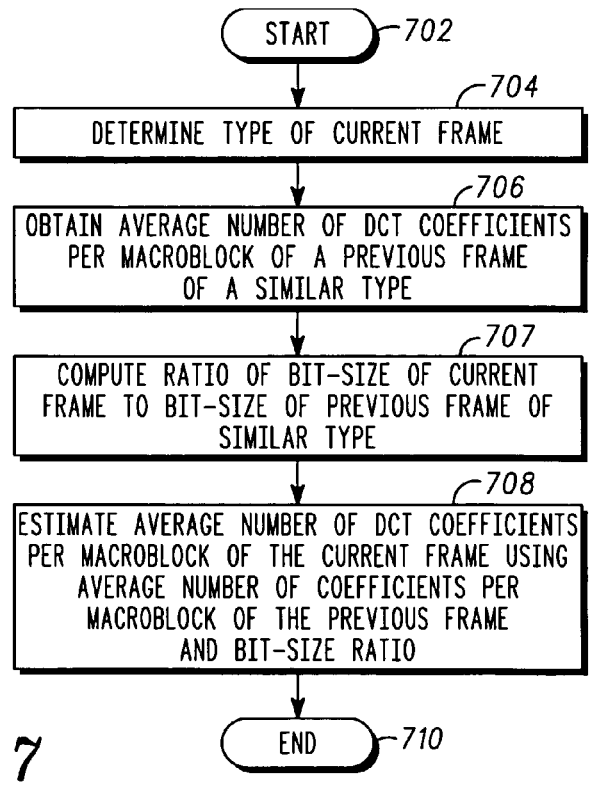
FIG. 7 is a flow diagram depicting an exemplary embodiment of a process for computing average spatial activity of a frame within an MPEG-2 bitstream in accordance with one or more aspects of the invention.

FIG. 7 is a flow diagram depicting an exemplary embodiment of a process 700 for computing the average spatial activity of a frame within an MPEG-2 bitstream in accordance with one or more aspects of the invention. The process 700 may be used in step 410 of the process 400 described above with respect to FIG. 4. The process 700 begins at step 702. At step 704, the type of the current frame is determined. For example, the current frame may be an I-, P-, or B-type frame. At step 706, the average number of DCT coefficients per coded macroblock of the previously processed frame of a similar type is obtained (i.e., the average spatial activity of the previous frame). In one embodiment, I- and P-frames are designated as being similar types. In another embodiment, the I-, P-, and B-frames are designated as separate types.

At step 707, a ratio of the bit-size of the current frame to the bit-size of the previous frame of similar type is computed. At step 708, an average number of DCT coefficients per coded macroblock of the current frame (i.e., average spatial activity of the current frame) is estimated using the average number of DCT coefficients per coded macroblock of the previous frame and the bit-size ratio computed in step 707. For example, the average spatial activity of the current frame may be estimated at step 708 by multiplying the previous measure of spatial activity (i.e., the average spatial activity of the previous frame of similar type) by the ratio of the picture sizes (i.e., the bit-size ratio). For purposes of clarity by example, the spatial activity measures have been described with respect to the number of DCT coefficients (in general, the number of frequency domain coefficients). Those skilled in the art will appreciate, however, that any of the spatial activity measures described above may also be used (e.g., the value of the DCT coefficients). The process 700 ends at step 710.

Figure 8:
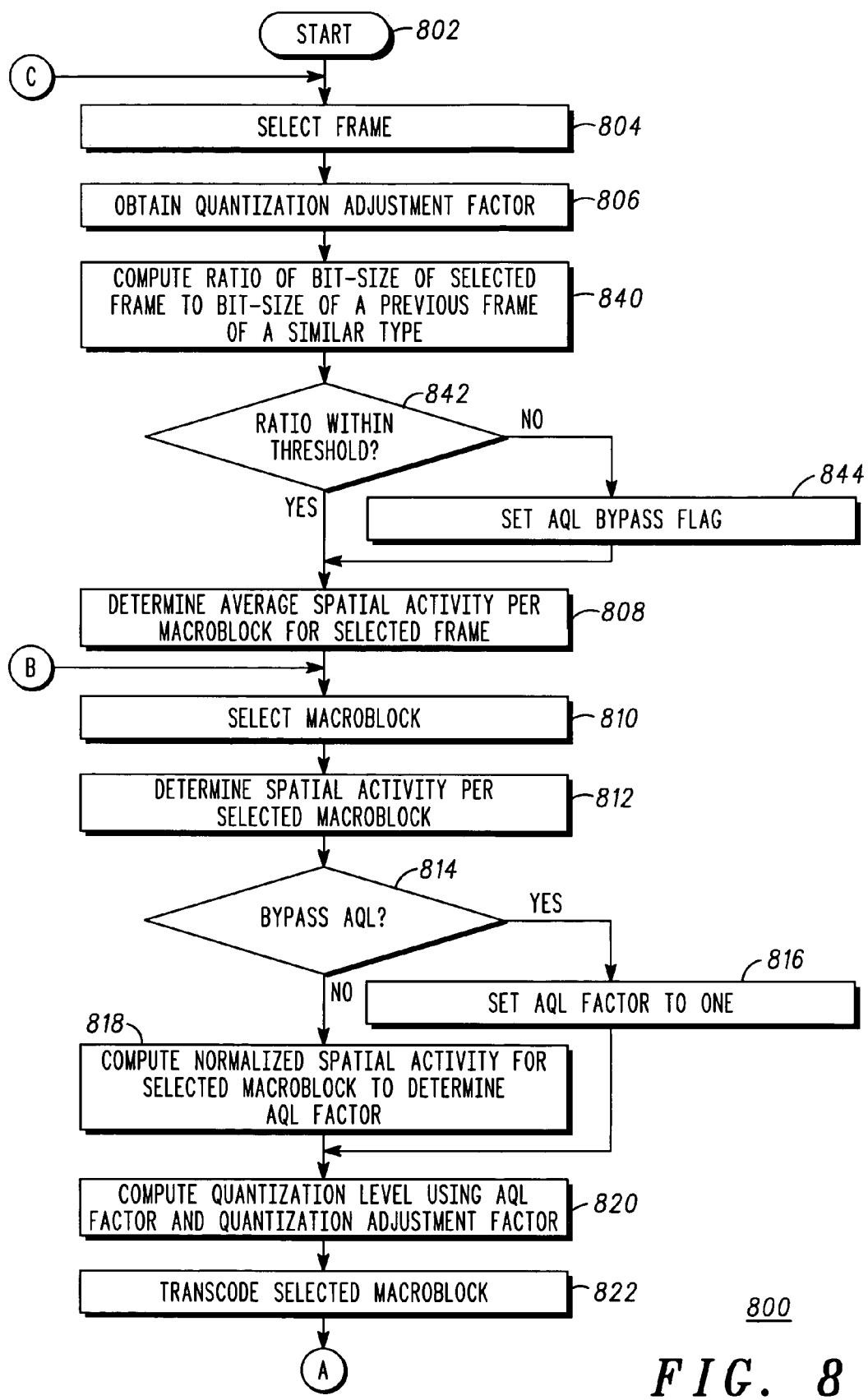
FIGS. 8 and 9 depict a flow diagram showing another exemplary embodiment of a process for transcoding a bitstream in accordance with one or more aspects of the invention.
Figure 9:
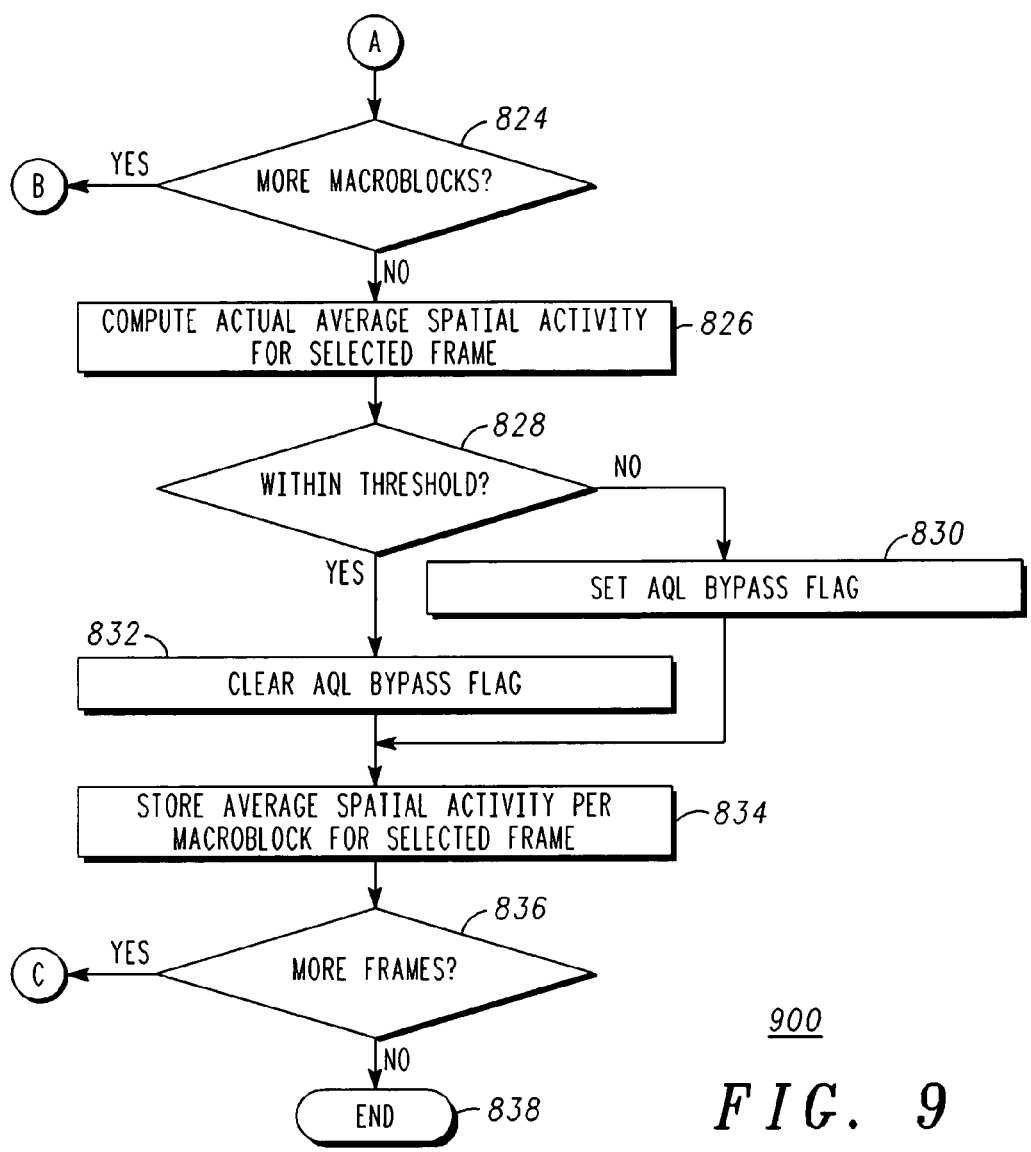

FIGS. 8 and 9 depict a flow diagram showing another exemplary embodiment of a process 800 for transcoding a bitstream in accordance with one or more aspects of the invention. The process 800 may be executed by the controller 112 shown in FIGS. 1 and 2, described above. The process 800 begins at step 802. At step 804, a frame is selected from the input bitstream for processing. At step 806, a quantization adjustment factor is obtained for the selected frame. The quantization adjustment factor may be determined as described above with respect to FIG. 4.

The process 800 proceeds from step 806 to step 840, where a ratio of the bit-size of the selected frame to the bit-size of a previous frame of a similar type is computed. For example, I- and P-frames may be similar types (e.g., if the selected frame is a P-frame, the previous frame of similar type may be an I- or P-frame). Alternatively, each of I-, P-, and B-frames may be separate types (e.g., if the selected frame is a P-frame, the previous frame of a similar type is also a P-frame). At step 842, a determination is made as to whether the bit-size ratio is within a predefined threshold. If so, the process proceeds to step 808. Otherwise, the process proceeds to step 844. At step 844, an AQL bypass flag is set. As described below, each macroblock in the selected frame may be transcoded using an adaptive quantization process. If the input picture sizes differ by a predefined threshold, the adaptive quantization process may be bypassed for each macroblock in the selected frame to reduce the effect of poor estimation due to scene changes, high motion, or special events (e.g., fade). Thus, if the AQL bypass flag is set, the macroblocks of the selected frame will be transcoded without using a computed AQL factor. The process 800 proceeds from step 844 to step 808.

At step 808, an average spatial activity value is determined for the selected frame using the average spatial activity of the previous frame (stored in step 834 described below). One embodiment of such a process is described above with respect to FIG. 7. At step 810, a macroblock is selected from the selected frame for processing. At step 812, a spatial activity value for the selected macroblock is determined. At step 814, a determination is made as to whether the adaptive quantization process is to be bypassed. If so, the process 800 proceeds to step 816, where the AQL factor is set to equal one. From step 816, the process 800 proceeds to step 820. In one embodiment of the invention, adaptive quantization is bypassed if one or more of the following occur: an AQL bypass flag has been set (step 844 described above or step 830 described below), the spatial activity for the selected macroblock falls outside a predefined range, or the quantization adjustment factor obtained at step 806 falls outside a predefined range. Notably, the adaptive quantization process may be bypassed if the computed value for either the macroblock spatial activity or the quantization adjustment factor is unusual. For example, the adaptive quantization process may be bypassed if the macroblock spatial activity is less than two or greater than 128. The adaptive quantization process may be bypassed if the quantization adjustment factor is less than one or greater than 2. Such values are merely illustrative, as other threshold ranges may be employed to determine whether the adaptive quantization process should be bypassed.

If, at step 814, the adaptive quantization process is not bypassed, the process 800 proceeds to step 818. At step 818, the normalized spatial activity for the selected macroblock is computed to determine the AQL factor. The normalized spatial activity may be computed using Equation 3 described above. At step 820, the quantization level for the selected macroblock associated with the input bitstream is adjusted using the AQL factor (which may have been set equal to one if the adaptive quantization process is bypassed) and the quantization adjustment factor obtained at step 806. The quantization level may be adjusted using Equation 2 described above. At step 822, the selected macroblock is transcoded in accordance with the adjusted quantization level. At step 824, a determination is made as to whether there are more macroblocks in the selected frame for processing. If so, the process 800 returns to step 810. Otherwise, the process 800 proceeds to step 826.

At step 826, the actual average spatial activity among the coded macroblocks in the selected frame is determined. At step 828, the actual average spatial activity value per coded macroblock for the selected frame is compared to the estimated value determined in step 808. If the actual value is within a predefined threshold of the estimated value, the process proceeds to step 832. Otherwise, the process 800 proceeds to step 830, wherein an AQL bypass flag is set. If the actual and estimated average spatial activities differ by the predefined threshold, the adaptive quantization process may be bypassed for each macroblock of the frame in the next iteration to reduce the effect of poor estimation due to scene changes, high motion, or special events (e.g., fade). From step 830, the process 800 proceeds to step 834.

At step 832, the AQL bypass flag is cleared. At step 834, the average spatial activity per macroblock for the selected frame is stored. As described above, values may be stored separately for each type of frame (e.g., I-, P-, and B-types). Alternatively, one value may be stored for the I- and P-type frames, and one value may be stored for the B-type frames. At step 836, a determination is made as to whether more frames are to be processed. If so, the process 800 returns to step 804. Otherwise, the process 800 ends at step 838.

For purposes of clarity by example, the process 800 has been described with respect to an MPEG-2 bitstream. Notably, the process 800 is employed with respect to macroblocks within frames or pictures defined by the MPEG-2 bitstream. In general, the process 800 may be employed with sets of video data (e.g., pixel domain data, or the corresponding frequency domain coefficient data), of which MPEG-2 macroblocks are examples. Moreover, the process 800 may employ any of the spatial activity measures described above (e.g., number of luma DCT coefficients, value of the input quantization level, value of the DCT coefficients).

Figure 10:
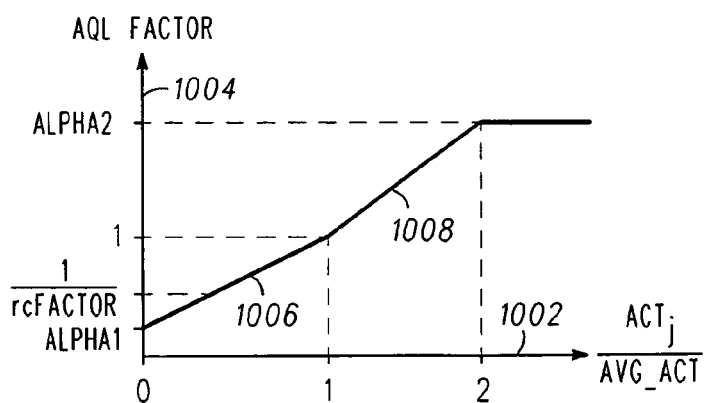
FIG. 10 is a graph illustrating another exemplary embodiment of the normalization function of for use with the transcoding processes described herein.

FIG. 10 is a graph 1000 illustrating another exemplary embodiment of the normalization function of Equation 2 described above. In the present embodiment, a piecewise continuous function is employed. The graph 1000 includes an axis 1002 representing the ratio of the spatial activity of the jth macroblock to the average spatial activity of the selected frame, and an axis 1004 representing the normalized spatial activity for the jth macroblock (i.e., the AQL factor). When the spatial activity of the macroblock is less than the average spatial activity of the frame, the AQL factor is determined using the segment 1006. Notably, the AQL factor may be determined in accordance with the following:

$$AQL\ Factor = alpha1 + (1 - alpha1) \times \frac{act_j}{avg\_act},\quad \text{Eq. 5}$$

where alpha1 is the lower bound of the AQL factor. The lower bound of the AQL factor depends on the selected function of rcFactor. For example, if $f(rcFactor)=rcFactor$, then the lower bound is 1/rcFactor. Note, however, that if AQL factor is less than 1/rcfactor, the effective AQL factor is 1/rcFactor, since the output quantization level must be greater than or equal to the input quantization level. When the spatial activity of the macroblock is equal to the average spatial activity of the frame, AQL factor equals one. When the ratio of the spatial activity of the macroblock to the average spatial activity of the frame is between one and two, AQL factor is determined using the segment 1008. Notably, the AQL factor may be determined in accordance with the following:

$$AQL\ Factor = (2 - alpha2) + (alpha2 - 1) \times \frac{act_j}{avg\_act},\quad \text{Eq. 6}$$

where alpha2 is the upper bound of the AQL factor. The upper bound of AQL factor depends on the selected function of rcFactor. For example, if $f(rcFactor)=rcFactor$, then the upper bound is rcFactor. When the spatial activity of the macroblock is greater than or equal to twice the average spatial activity of the frame, AQL factor equals alpha2. In one embodiment of the invention, the actual values used for alpha1 and alpha2 may be shifted from their predicted values based on $f(rcFactor)$. For example, the inventors have determined that an optimum value for alpha1 is $(1/rcFactor)^3$, and that an optimum value for alpha2 is $1+(rcFactor-1)\times 3/8$. Such values are merely illustrative, however, as other values for alpha 1 and alpha2 may be used.

The processes and methods described above may be implemented as a computer readable carrier. Program(s) of the computer readable carrier define functions of embodiments and can be contained on a variety of media, which include, but are not limited to: (i) information permanently stored on non-writable storage media (e.g., read-only memory devices within a computer such as CD-ROM or DVD-ROM disks readable by a CD-ROM drive or a DVD drive); (ii) alterable information stored on writable storage media (e.g., floppy disks within a diskette drive or hard-disk drive or read/writable CD or read/writable DVD Such media or computer readable carriers, when carrying computer-readable instructions that direct functions of the invention, represent embodiments of the invention.

While the foregoing is directed to illustrative embodiments of the present invention, other and further embodiments of the invention may be devised without departing from the basic scope thereof, and the scope thereof is determined by the claims that follow.

The invention claimed is:

1. A method of processing a bitstream in a digital video transcoder, comprising:
    (a) determining an adjustment factor that is a ratio of a number of bits representing a selected frame defined by said bitstream to a target number of bits for said selected frame;
    (b) determining an average spatial activity value among sets of video data associated with said selected frame;
    (c) determining a spatial activity value for a selected set of said sets of video data; and
    (d) computing a normalized spatial activity value for said selected set of video data in response to said average spatial activity value, said spatial activity value, and a function of said adjustment factor;
    wherein said normalized spatial activity value is computed using a second function, defined by:

$$N\_act_j = \frac{f(rcFactor) \times act_j + avg\_act}{act_j + f(rcFactor) \times avg\_act},$$

where j represents said selected set of video data, $N\_act_j$ is said normalized spatial activity, rcFactor is said adjustment factor, f is said function of said adjustment factor wherein f is not a constant function, $act_j$ is said spatial activity value, and avg_act is said average spatial activity value.

2. The method of claim 1, further comprising:
(e) adjusting a quantization value associated with said selected set of video data in response to said normalized spatial activity value.

3. The method of claim 2, further comprising:
(f) repeating steps (c) through (e) for one or more additional selected sets of said sets of video data.

4. The method of claim 3, further comprising:
(g) repeating steps (a) through (f) for one or more additional frames defined by said bitstream.

5. The method of claim 4, wherein said average spatial activity value associated with said selected frame is estimated in response to a previous average spatial activity value associated with a previous frame and a ratio of the number of bits representing said selected frame and a number of bits representing said previous frame.

6. The method of claim 1, wherein said spatial activity value is determined in response to a number of frequency domain coefficients in said selected set of video data.

7. The method of claim 1, wherein said spatial activity value is determined in response to values of frequency domain coefficients in said selected set of video data.

8. The method of claim 1, wherein said spatial activity value is determined in response to a quantization value associated with said selected set of video data.

9. The method of claim 1, wherein adjustment is conditional on said function of bits being unequal to said target number of bits, and wherein said function of said adjustment factor is defined by:

$$f(rcFactor)=rcFactor.$$

10. The method of claim 1, wherein said second function is approximated using a piecewise continuous function.

11. The method of claim 1, further comprising:
(e) adjusting a quantization value associated with said selected set of video data in accordance with a third function, defined by:

$$outQL=inQL \times rcFactor \times N\_act_j,$$

where outQL is said adjusted quantization value and inQL is said quantization value, and wherein adjustment is conditional on said number of bits being unequal to said target number of bits.

12. A method of processing a bitstream in a digital video transcoder, comprising:
(a) determining an adjustment factor that is a ratio of a number of bits representing a selected frame defined by said bitstream to a target number of bits for said selected frame;
(b) determining an average spatial activity value among macroblocks associated with said selected frame;
(c) determining a spatial activity value for a selected macroblock; and
(d) computing a normalized spatial activity value for said selected macroblock in response to said average spatial activity value, said spatial activity value, and a function of said adjustment factor;

wherein said normalized spatial activity value is computed using a second function, defined by:

$$N\_act_j = \frac{f(rcFactor) \times act_j + avg\_act}{act_j + f(rcFactor) \times avg\_act},$$

where j represents said selected set of frequency domain coefficients, $N\_act_j$ is said normalized spatial activity, rcFactor is said adjustment factor, f is said function of said adjustment factor wherein f is not a constant function, $act_j$ is said spatial activity value, and avg_act is said average spatial activity value.

13. The method of claim 12, further comprising:
(e) adjusting a quantization value associated with said selected macroblock in response to said normalized spatial activity value.

14. The method of claim 13, further comprising:
(f) repeating steps (c) through (e) for one or more additional selected macroblocks of said macroblocks.

15. The method of claim 14, further comprising:
(g) repeating steps (a) through (f) for one or more additional frames defined by said bitstream.

16. The method of claim 15, wherein said average spatial activity value associated with said selected frame is estimated in response to a previous average spatial activity value assocaited with a previous frame and a ratio of the number of bits representing said selected frame and a number of bits representing said previous frame.

17. The method of claim 16, wherein each frame defined by said bitstream is one of an I-type, a P-type, and a B-type, and wherein said previous frame and said selected frame are of identical types.

18. The method of claim 16, wherein each frame defined by said bitstream is one of a first type and a second type, said first type being defined by an I-frame or a P-frame, and said second type being defined by a B-frame, and wherein said previous frame and said selected frame are of identical types.

19. The method of claim 12, wherein said spatial activity value is determined in response to discrete cosine transform (DCT) coefficients associated with said selected macroblock.

20. The method of claim 19, wherein step (c) further comprises:
(c1) identifying coded luma blocks in said selected macroblock using a coded block pattern recovered from said bitstream;
(c2) determining a number of DCT coefficients among said identified coded luma blocks; and
(c3) defining said spatial activity value with respect to said number of DCT coefficients among said identified coded luma blocks.

21. The method of claim 19, wherein step (c) further comprises:
(c1) identifying coded luma blocks and coded chroma blocks in said selected macroblock using a coded block pattern recovered from said bitstream;
(c2) determining a number of DCT coefficients among said identified coded luma blocks and coded chroma blocks; and
(c3) defining said spatial activity value with respect to said number of DCT coefficients among said identified coded luma blocks and coded chroma blocks.

22. The method of claim 12, wherein adjustment is Conditional on said function of bits being unequal to said target number of bits, and wherein said function of said adjustment factor is defined by:

$$f(rcFactor)=rcFactor.$$

23. The method of claim 12, wherein said second function is approximated using a piecewise continuous function.

24. Apparatus for processing a bitstream in a digital video transcoder, comprising:
means for determining a ratio of a number of bits representing a selected frame defined by said bitstream to a target number of bits for said selected frame to define an adjustment factor;

means for determining an average spatial activity value among sets of frequency domain coefficients associated with said selected frame, each of said sets of frequency domain coefficients having at least one frequency domain coefficient;

means for determining a spatial activity value for a selected set of said sets of frequency domain coefficients; and means for computing a normalized spatial activity value for said selected set of frequency domain coefficients in response to said average spatial activity value, said spatial activity value, and a function of said adjustment factor;

wherein said normalized spatial activity value is computed using a second function, defined by:

$$N\_act_j = \frac{f(rcFactor) \times act_j + avg\_act}{act_j + f(rcFactor) \times avg\_act},$$

where j represents said selected set of frequency domain coefficients, N_act$_j$ is said normalized spatial activity, rcFactor is said adjustment factor, f is said function of said adjustment factor wherein f is not a constant function, act$_j$ is said spatial activity value, and avg_act is said average spatial activity value.

25. A computer readable storage medium encoding program instructions for causing a computer to process a bitstream, the instructions comprising steps for:

(a) determining an adjustment factor that is a ratio of a number of bits representing a selected frame defined by said bitstream to a target number of bits for said selected frame;

(b) determining an average spatial activity value among sets of video data associated with said selected frame;

(c) determining a spatial activity value for a selected set of said sets of video data; and (d) computing a normalized spatial activity value for said selected set of video data in response to said average spatial activity value, said spatial activity value, and a function of said adjustment factor;

wherein said normalized spatial activity value is computed using a second function, defined by:

$$N\_act_j = \frac{f(rcFactor) \times act_j + avg\_act}{act_j + f(rcFactor) \times avg\_act},$$

where j represents said selected set of frequency domain coefficients, N_act$_j$ is said normalized spatial activity, rcFactor is said adjustment factor, f is said function of said adjustment factor wherein f is not a constant function, act$_j$ is said spatial activity value, and avg_act is said average spatial activity value. of said adjustment factor.

* * * * *